(12) United States Patent
Mader et al.

(10) Patent No.: US 9,004,262 B2
(45) Date of Patent: Apr. 14, 2015

(54) DEVICE FOR CONVEYING PLATE-SHAPED ELEMENTS

(75) Inventors: Leopold Mader, Neuhofen/Ybbs (AT); Alexander Kronsteiner, Blindenmarkt (AT)

(73) Assignee: LISEC Austria GmbH, Seitenstetten (AT)

( * ) Notice: Subject to any disclaimer, the term of this patent is extended or adjusted under 35 U.S.C. 154(b) by 344 days.

(21) Appl. No.: 13/641,811

(22) PCT Filed: Mar. 17, 2011

(86) PCT No.: PCT/AT2011/000135
§ 371 (c)(1),
(2), (4) Date: Oct. 17, 2012

(87) PCT Pub. No.: WO2011/137467
PCT Pub. Date: Nov. 10, 2011

(65) Prior Publication Data
US 2013/0040541 A1  Feb. 14, 2013

(30) Foreign Application Priority Data

May 3, 2010  (AT) .................................. A 744/2010

(51) Int. Cl.
*B65G 47/22* (2006.01)
*B65G 49/06* (2006.01)
*B65G 21/20* (2006.01)

(52) U.S. Cl.
CPC ............ *B65G 49/063* (2013.01); *B65G 21/209* (2013.01)

(58) Field of Classification Search
CPC ............ B65G 49/063; H01L 21/67784; H01L 21/67712; H01L 21/67051

USPC ................ 198/493, 495; 406/88; 65/146, 148
See application file for complete search history.

(56) References Cited

U.S. PATENT DOCUMENTS 3,734,567 A * 5/1973 Fong ................................ 406/86
4,589,541 A   5/1986 Lisec
5,027,941 A * 7/1991 Lenhardt ....................... 198/721
(Continued)

FOREIGN PATENT DOCUMENTS

DE  297 01 124 U1  3/1997
EP  0 920 954 A2   6/1999
(Continued)

OTHER PUBLICATIONS

Japanese Office Action, dated Sep. 3, 2013, from corresponding JP application.
(Continued)

*Primary Examiner* — James R Bidwell
(74) *Attorney, Agent, or Firm* — Young & Thompson

(57) ABSTRACT

Disclosed is a linear conveyor (21) for transporting glass panels (3) in the vicinity of grinding stations (9, 13) or a washing station (15) of a system for producing glass panel blanks including a linear conveyor (23), for example, a driven toothed belt, and opposite the driven toothed belt a beam (25), from which a fluid, in particular water, is discharged. The glass panel (3) is pressed against the linear conveyor (23) in a non-positive manner and reliably conveyed by water discharged from the beam (25). Such linear conveyors (21) can be arranged at the upper or lower edge of a glass panel (3) in order to trim the glass panel using at least one grinding disk (27), for example.

18 Claims, 9 Drawing Sheets

(56) References Cited

U.S. PATENT DOCUMENTS

| | | | |
|---|---|---|---|
| 5,332,080 A * | 7/1994 | Lenhardt et al. | 198/497 |
| 2005/0011229 A1 | 1/2005 | Lisec | |
| 2005/0199493 A1 * | 9/2005 | Bangert et al. | 204/298.23 |
| 2006/0180140 A1 | 8/2006 | Lisec | |
| 2007/0271756 A1 | 11/2007 | Aoki et al. | |
| 2008/0003091 A1 | 1/2008 | Bonora | |
| 2011/0008145 A1 | 1/2011 | Huber | |

FOREIGN PATENT DOCUMENTS

| | | |
|---|---|---|
| EP | 2042454 A1 | 1/2009 |
| JP | H0536658 A | 2/1993 |
| JP | 2001151318 A | 5/2001 |
| JP | 2001-213517 | 8/2001 |
| JP | 2002-308421 | 10/2002 |
| JP | 3914717 | 5/2007 |
| JP | 4168409 | 10/2008 |
| KR | 2001 0070234 A | 7/2001 |
| KR | 100548944 | 2/2006 |
| TW | 200913116 | 3/2009 |
| WO | 2009074317 | 6/2009 |

OTHER PUBLICATIONS

CN Office Action dated Jan. 23, 2014; Application No. 201180022298.0.
European Office Action, dated Aug. 27, 2013, from corresponding EP application.
International Search Report, dated Jul. 21, 2012, from corresponding PCT application.
Russian Office Action from corresponding RU application.

* cited by examiner

9/13

DEVICE FOR CONVEYING PLATE-SHAPED ELEMENTS

BACKGROUND OF THE INVENTION

1. Field of the Invention

The invention relates to a device for conveying plate-shaped elements—plates, such as (flat-) glass panels, for example.

2. Description of the Related Art

For the conveying of plate-shaped elements such as glass panels, there are a variety of devices. Known are devices that work with rollers and/or conveyor belts or conveyor chains.

A problem with the known conveying devices is ensuring the necessary traction between the element to be conveyed, such as a glass panel, for example, and the conveying means (rollers, conveyer belts, and so forth). Absolutely steady transport is necessary, for example, in the conveying of glass panels in grinding lines, in which the edges are to be ground (trimmed), on the one hand, and in, among others, washing and sealing systems, on the other hand.

BRIEF SUMMARY OF THE INVENTION

The object of the invention is to indicate a conveying device that ensures steady transport of vertical, or mostly vertically oriented, plate-shaped elements.

This object is achieved with a device according to the present invention that conveys flat workpieces.

Preferred and advantageous configurations of the invention are subjects of the sub-claims.

Steady transport is ensured since in the device according to the invention, a powered (linear) conveying means, such as, for example, a train of conveyor rollers or an (endless) conveyor belt, is provided on one side for conveying plate-shaped or panel-shaped elements (objects) such as glass panels and because the necessary traction between the (linear) conveying means and the element to be conveyed is ensured by at least one fluid cushion, which is provided on the side of the element to be conveyed facing the conveying means, first and foremost a cushion that consists of a liquid, especially a water cushion. In this case, the surfaces of the element to be conveyed that face the conveying means are not touched mechanically (i.e., by rollers, conveyor belts, etc.) because the element to be conveyed is loaded on this surface only by the fluid film (water film). This is especially advantageous when glass panels that have a coating on one side are to be conveyed as is the case, for example, with heat-reflecting glass or glass for photovoltaic elements and equipment.

The conveying device according to the invention can, for example, be used with grinding systems and/or washing systems or in systems used to manufacture insulated glass.

Within the scope of the invention, it may be provided that the element to be conveyed will be supported from beneath by supporting rollers or other means of support. The element to be conveyed may be supported from behind by a wall—an air cushion wall, for example—especially when the conveying plane is mostly vertical; the wall can, as is known per se, be tilted a bit rearward from the vertical, 5 degrees, for example.

Also taken into account within the scope of the invention is the provision of the conveying device both in the upper and the lower areas of an element to be conveyed. If the conveying devices according to the invention are used in, for example, glass-grinding lines, both the lower and the upper edges of the glass panels can be treated simultaneously by grinding.

The supporting rollers or ribbons (belts) that support the element to be conveyed from beneath can be, for example, powered or free-running supporting rollers (castors) of the supporting ribbons (belts).

The conveying device according to the invention is especially valuable in connection with machines that are designed to process the glass edges for solar elements. The edges and corners can thus be worked by abrasive disks, such as peripheral profiling disks, and/or abrasive belts (abrasive belts arranged crosswise) in a single pass, whereby, on the one hand, the cycle time of a follow-on hardening facility is achieved, while simultaneously the grinding quality remains constant over the entire service life of the abrasive disks and abrasive belts.

The tool-changing time is many times shorter than with conventional, horizontal procedures with multi-head grinding systems.

The transport devices according to the invention can also be deployed in facilities for edge grinding and face grinding of rectangular glass panels in a fully automatic cycle with (peripheral) abrasive disks and/or diamond abrasive belts. In this case, the glass panels are conveyed standing vertically through the facility, whereby they are supported on only one side (rear side) by the transport means (rollers or belts) and are pressed against the means of transport from the front by the fluid cushion, especially a water cushion.

In particular, a facility for grinding rectangular glass panels can comprise, for example, two grinding machines with a turning device arranged between them in such a way that it is possible to work all four edges of rectangular glass panels in a continual pass.

With the conveying device according to the invention, a glass panel can be transported standing nearly vertically in a grinding/edging system and can be worked on the upper and lower edges in continuous operation in the grinding system without being forcefully guided on the front, since while being processed, the pane is pressed against the means of transport by the fluid (especially water) cushion and is well stabilized while being processed in continuous operation.

When a system is being operated that is for the grinding/edging of rectangular glass panels with the help of abrasive disks and/or abrasive belts that are, for example, arranged cross-wise (cf. EP 0 920 954 A), a turning station can be provided between the grinding stations; this turning station can ensure that the glass panels are turned 90 degrees when the glass panel has left the first grinding station. In this case, it is possible to operate such that the glass panel that has been transferred into a loading station by a turning device is first oriented such that its long edges stand essentially vertically so that the shorter edges can first be processed (ground and/or trimmed). After leaving the first grinding system, the glass panel is turned again, so that the longer edges are now horizontally oriented and are processed in the second grinding system. The distance from the glass panel ahead of it is thus reduced, and the possibility exists of transporting it along into the following wash system nearly seamlessly.

The turning devices that are provided in the turning station preferably comprise a turning gripper with two arms that stand normally to each other, whereby the grippers can pivot around an axis that stands vertical to the conveying plane. It is preferably provided that the arms of the turning device are equipped with fingers that are arranged to be able to pivot on the arms of the turning device from a position (working position) that stands normally to the conveying plane or to the plane defined by the two arms of the turning device, to a position (preparation position) parallel to said plane. This designing of the turning device with pivoting fingers ensures that the turning devices in the turning stations touch the workpieces (glass panels) that are leaning on the support wall—an air cushion support wall, for example—only on their edges and that the opposite (front) side facing the support wall that is equipped with, for example, a coating or for photovoltaics is not touched when being turned in the turning stations. To swing the turning devices back in the turning stations, the fingers are pivoted into their preparation position, so that they have clearance from the glass panels that are behind them or are being transported through; these panels can thus just be transported through the turning station, for example, when no turning operation is necessary.

BRIEF DESCRIPTION OF THE DRAWINGS

Further details, features, and advantages of the invention are presented in the following description of preferred embodiments of a device according to the invention based on the drawings.

Here.

DETAILED DESCRIPTION OF THE PREFERRED EMBODIMENTS

Figure 1:
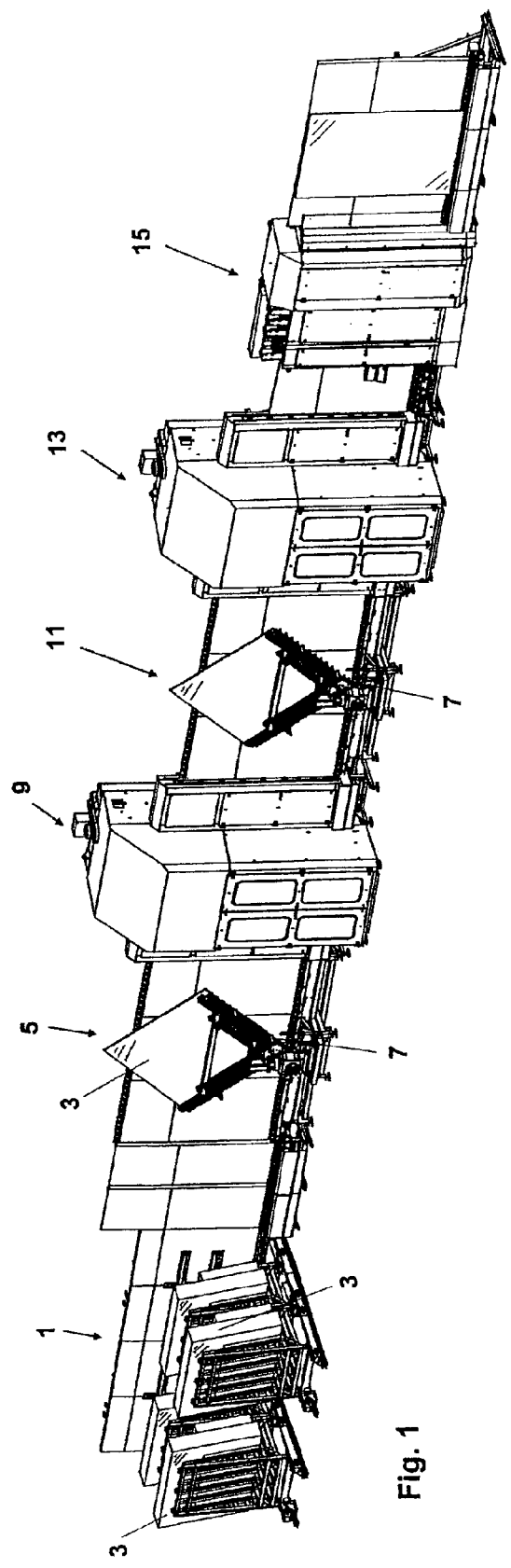
FIG. 1 shows in the example a facility with two grinding stations and one washing station, as well as with two turning devices.

A facility shown in FIG. 1 for manufacturing glass panels with ground/trimmed edges comprises a loading station 1, in which glass panels 3 coming from a glass cutting device or a storage unit are transferred to the facility. After the loading station 1, a first turning station 5 with a first turning device 7 is provided, which turning device orients the glass panels 3 that have been transferred to the facility in such a manner that their longer edges stand vertically. In the subsequently provided first grinding station 9, the upper and lower horizontal edges of the glass panel 3 are continuously processed, especially ground and/or trimmed.

After the first grinding station 9, a second turning station 11 is provided with a second turning device 7, which rotates the glass panel 3 by 90 degrees, so that the edges of the glass panel 3 that have not yet been processed (the longer edges) are now horizontally oriented. Behind the second turning station 11 is a second grinding station 13, in which the now horizontally oriented (longer) upper and lower edges of the glass panel 3 are processed (ground/trimmed). Subsequently, a washing system 15 is provided in which the trimmed glass panels 3, which can be coated glass panels 3 and/or glass panels 3 for solar arrays, are washed.

Figure 2:
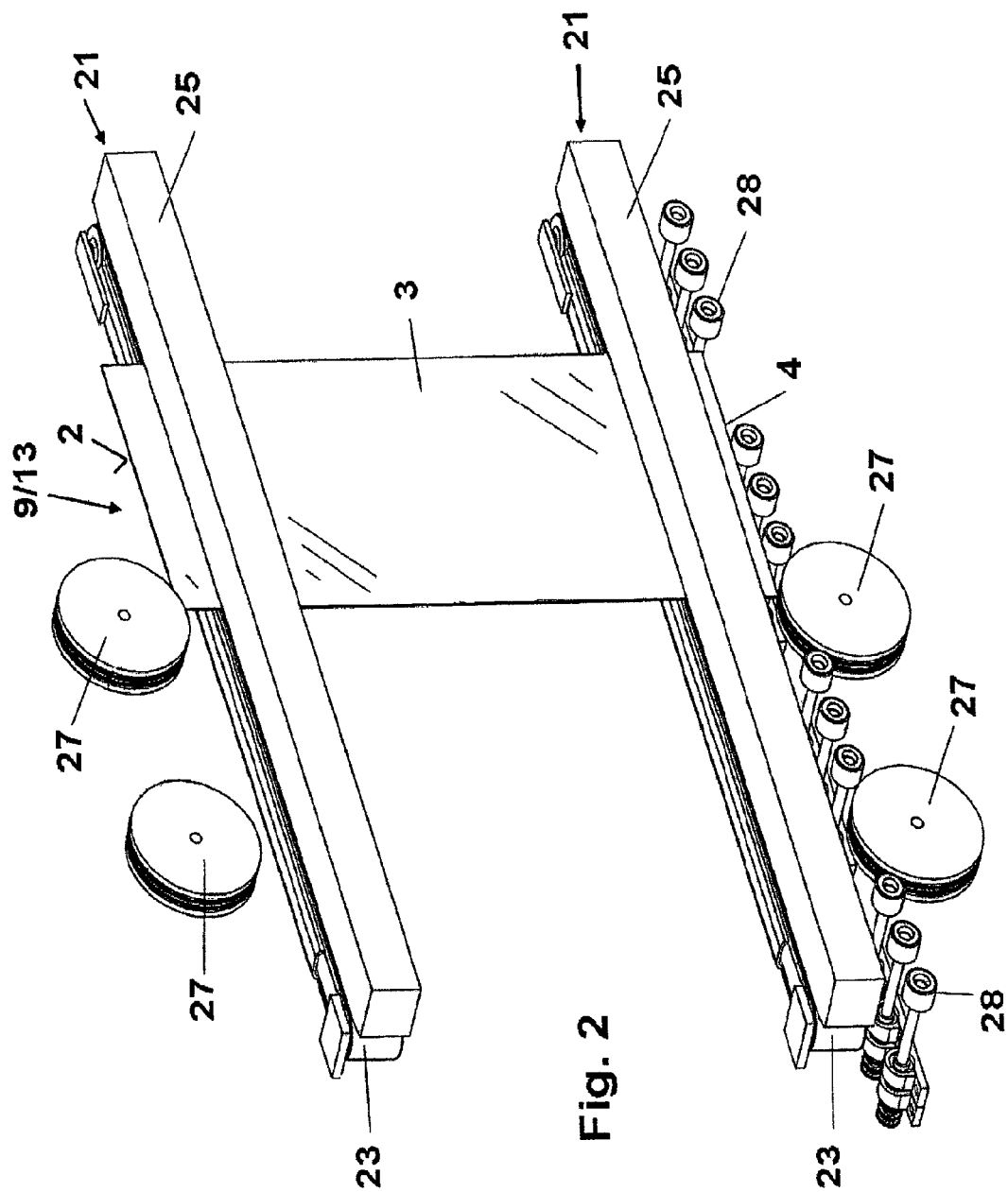
FIG. 2 shows a grinding station schematically.
Figure 5:
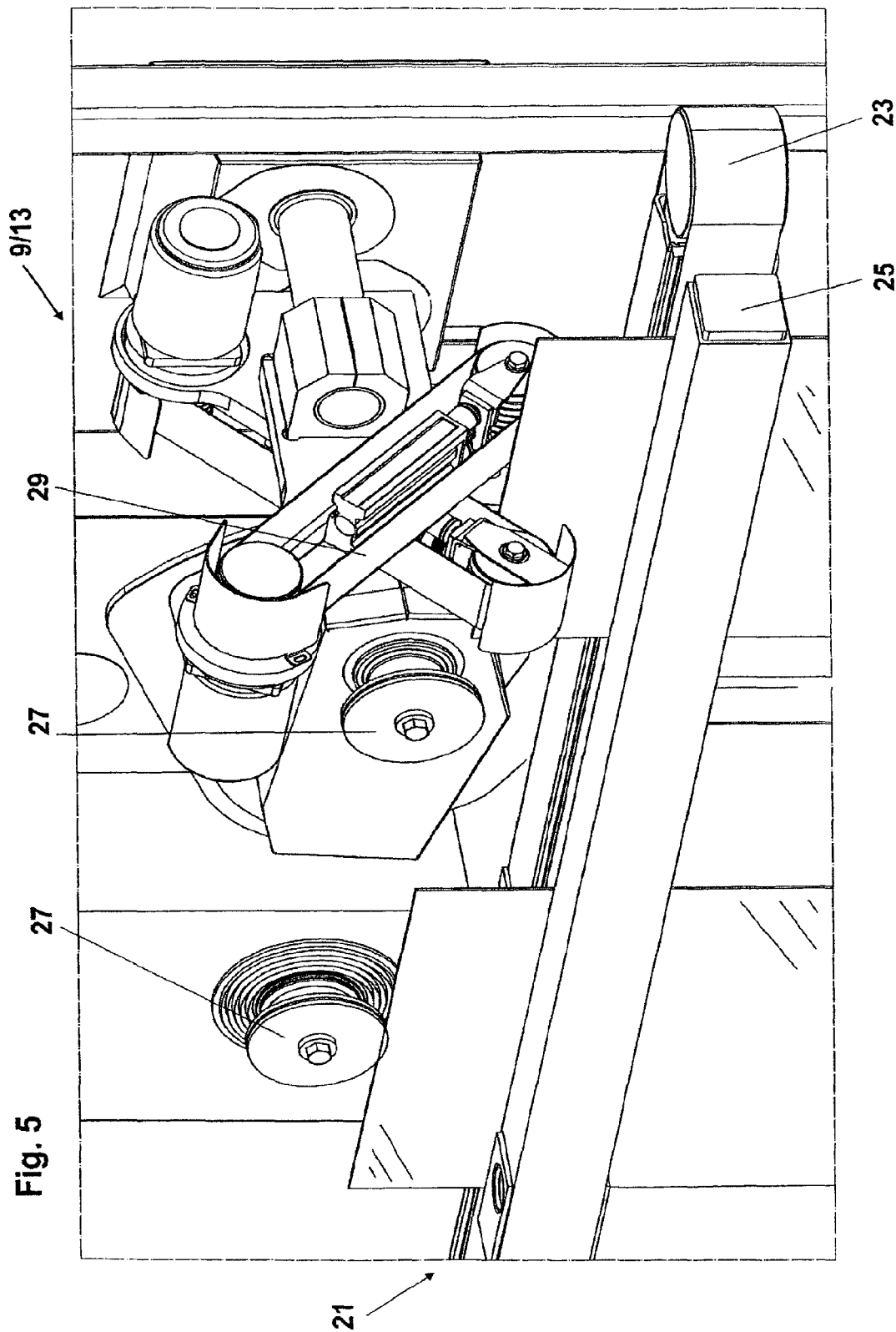
FIG. 5 shows a detail of the grinding station from FIGS. 3 and 4.

In the grinding stations 9 and 13 and in the washing station 15, devices 21 are provided for transporting the glass panels 3, such as are shown in greater detail in FIGS. 2 and 5. These conveying devices 21 are each composed of a powered toothed belt 23 (or a series of toothed belts) and a water cushion beam 25 arranged relative to the latter. Below the arrangement 21 of toothed belts 23 and water cushion beams 25, rollers 28 (optionally powered) are provided, on which rollers the glass panel 3 that is to be transported (conveyed) stands.

Devices 21 consisting of toothed belts 23 (as linear conveying means) and water cushion beams 25 (fluid cushion beams) are arranged on the upper and lower edges 2, 4 of the glass panel 3, such that the glass panel stands with its upper edge 2 facing upward and its lower edge 4 facing downward. Thus, processing can be done by grinding disks 27 and grinding belts 29 (FIG. 5).

Figure 3:
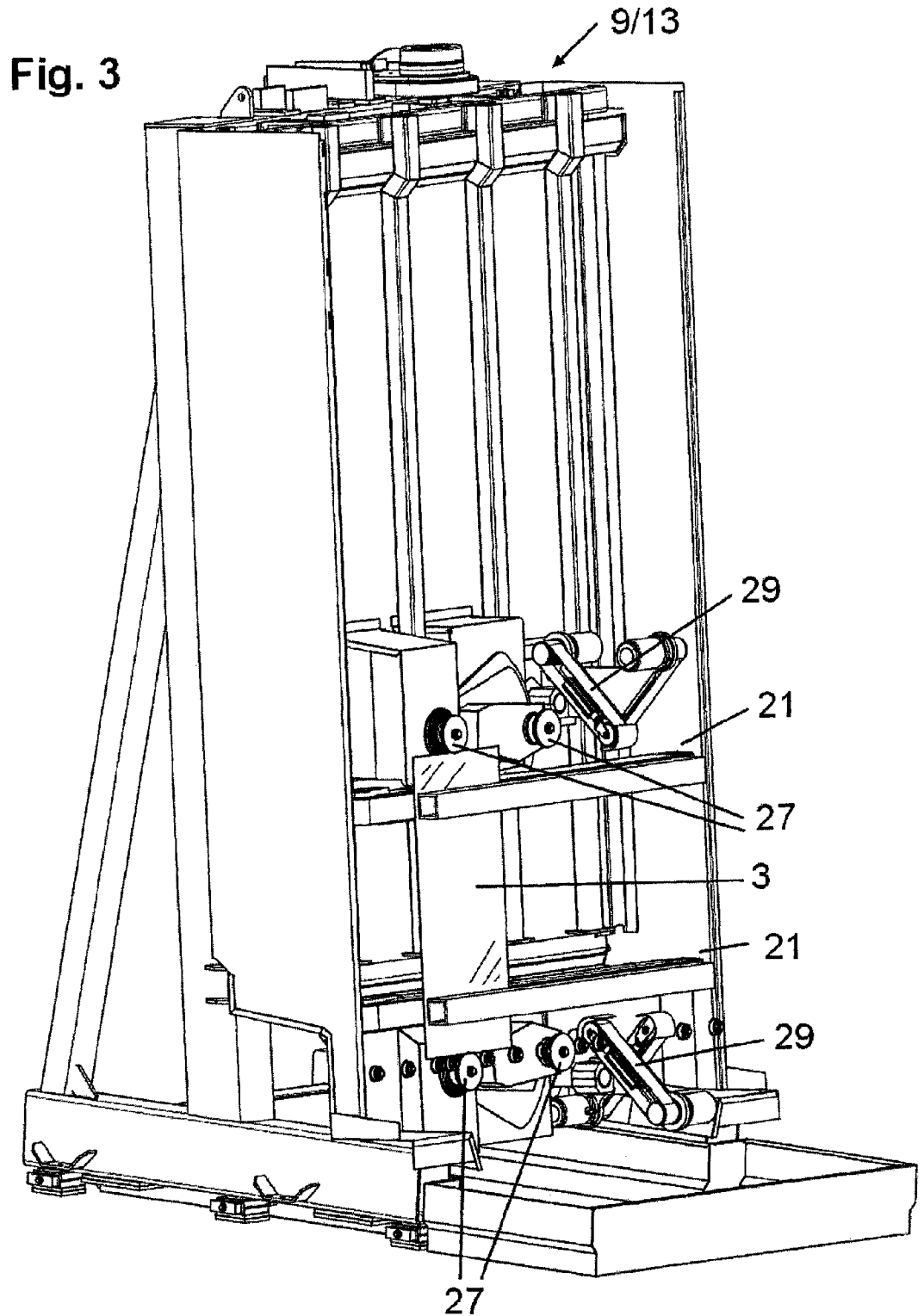
FIG. 3 shows another configuration of a grinding station from the front.
Figure 4:
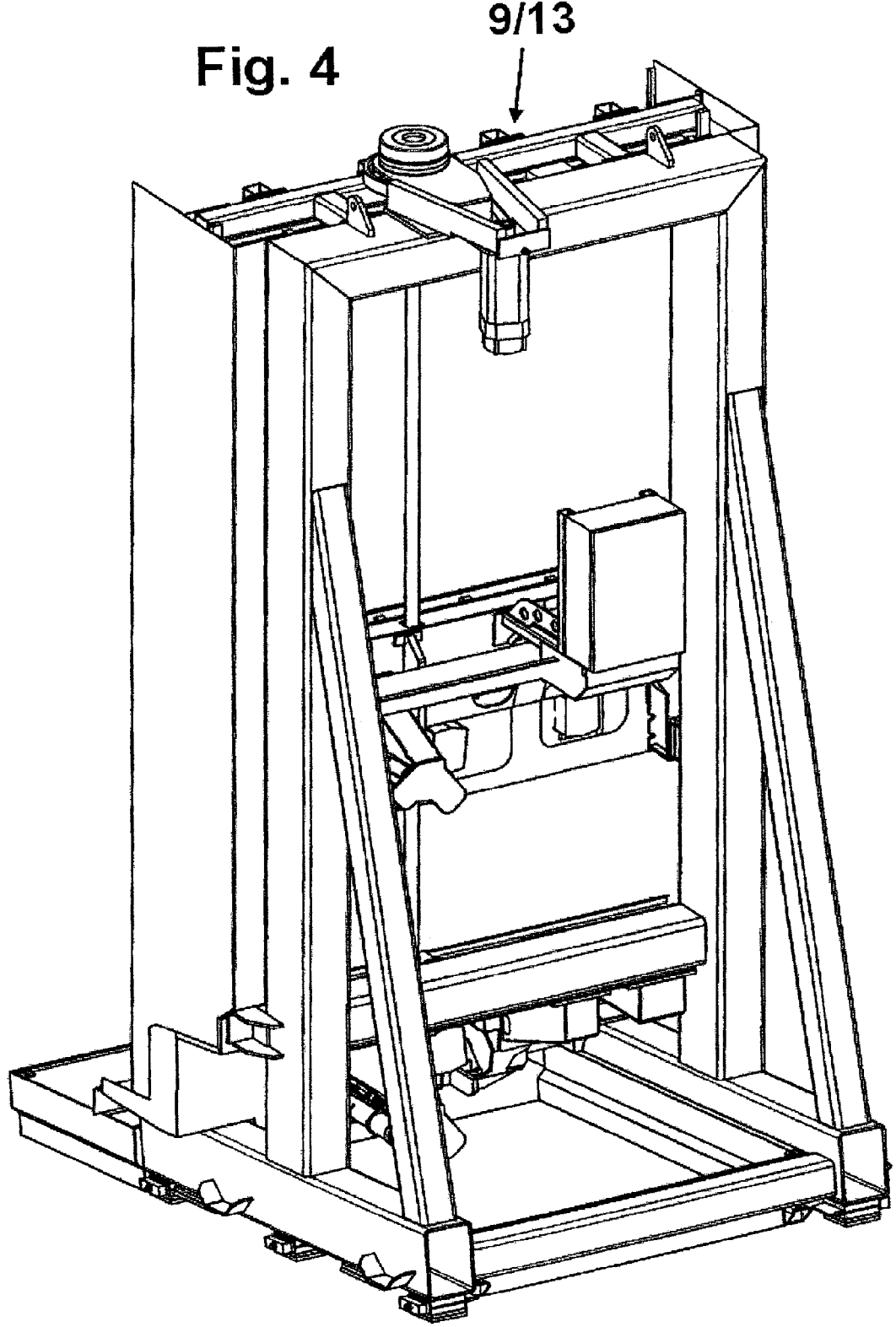
FIG. 4 shows the grinding station from FIG. 3 from the rear.

Here, the upper device 21, comprising a water cushion beam 25 and a belt drive 23, is vertically adjustable, as is especially shown in FIGS. 3 and 4.

Figure 6:
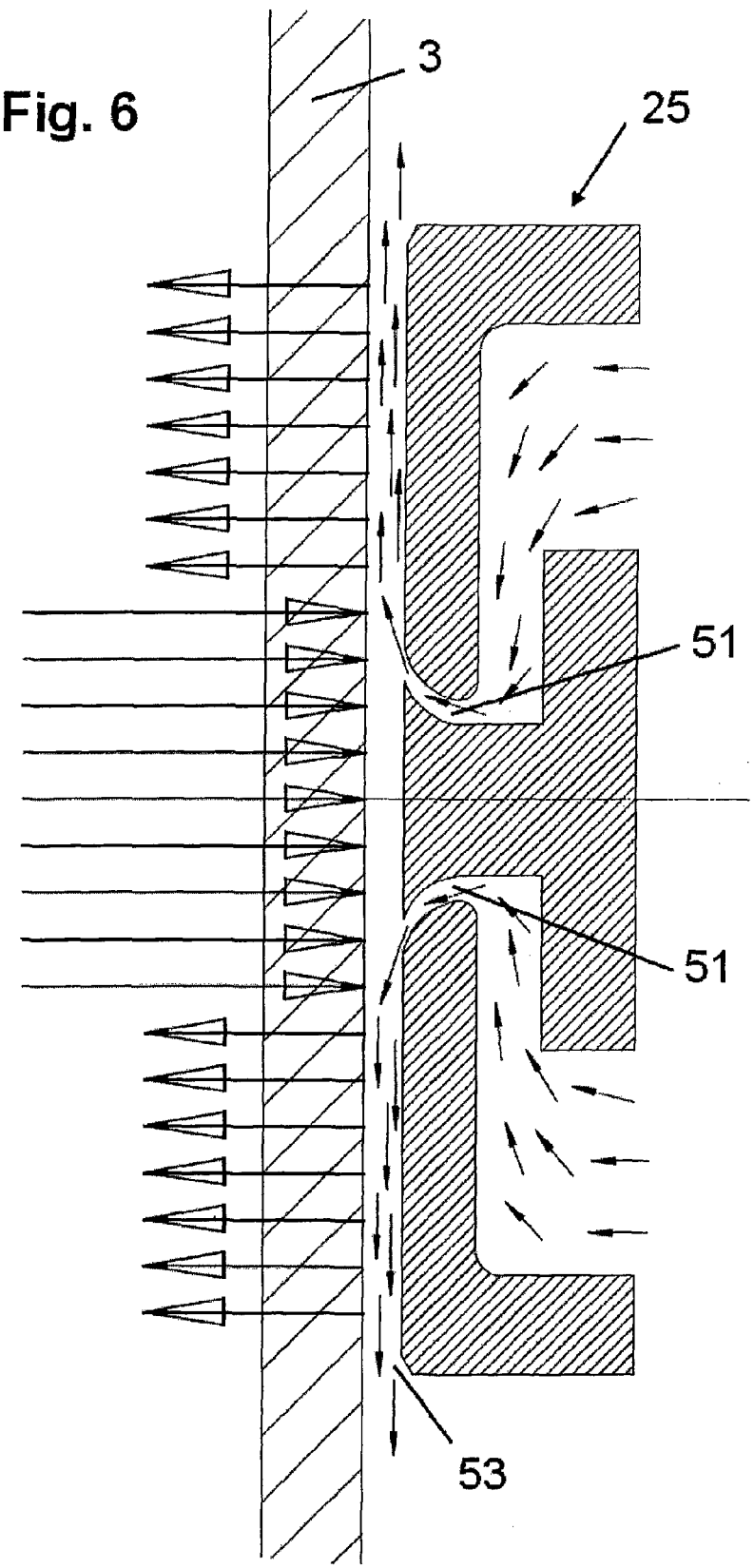
FIG. 6 shows a detail of the water cushion beam.

A first possible embodiment of a water cushion beam 25 (device used to press a glass panel 3 against the linear conveying device 23), which can also be driven by a gaseous fluid, is shown in FIG. 6. In this embodiment, the fluid (gas or especially water) is forced through two narrow slots 51 into the space 53 between the glass panel 3 and the water cushion beam 25, so that according to Bernoulli's principle, as is indicated by arrows in FIG. 6, the glass panel 3 is held at a constant distance from the water cushion beam 25 without being touched by it and is simultaneously pressed against the conveyer belt 23 of the linear conveyer.

Figure 7:
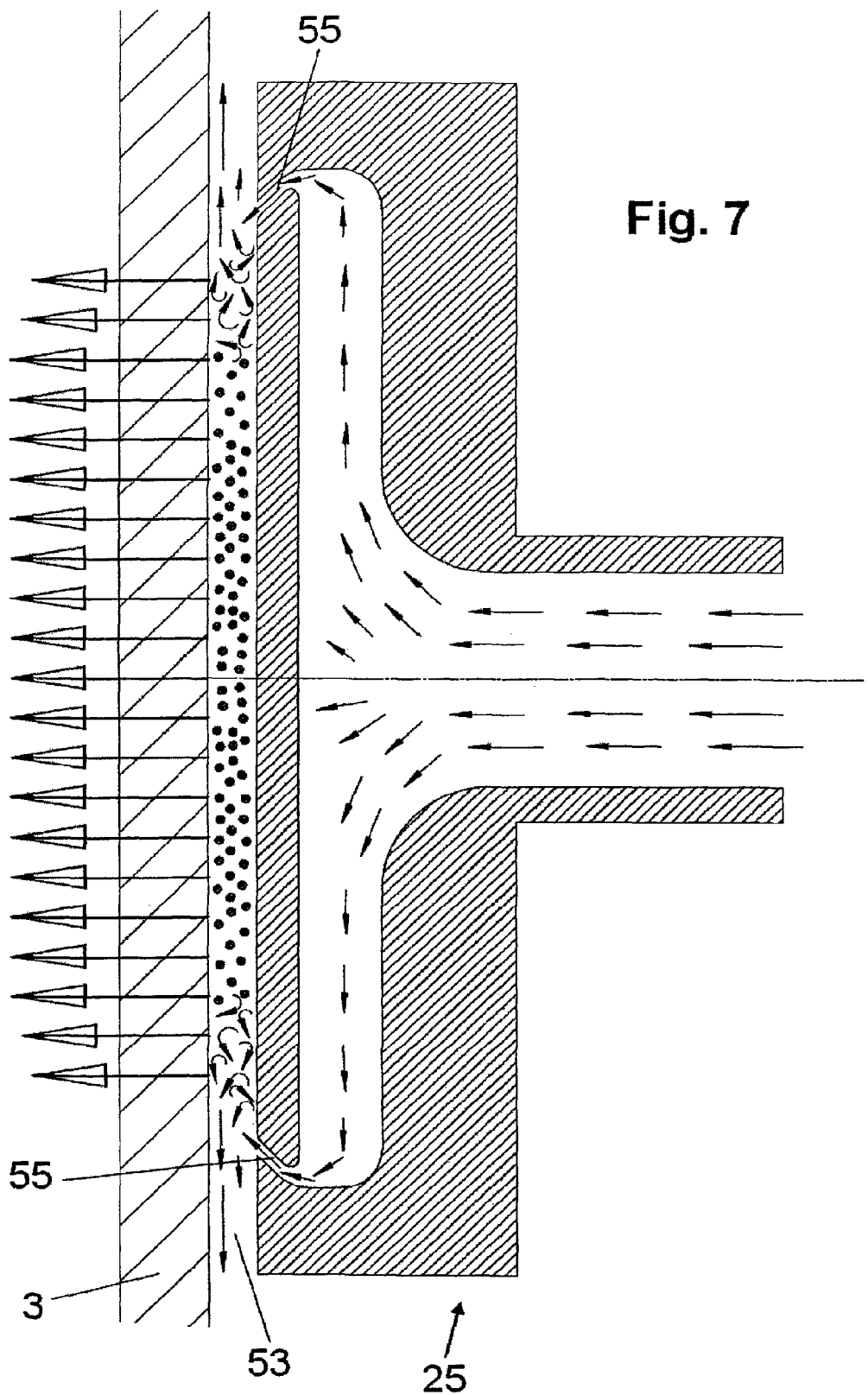
FIG. 7 shows a detail of the water cushion beam in a different configuration.

A different embodiment of a fluid or water cushion beam 25 is shown in FIG. 7. Here, fluid (gas or especially a liquid, such as water) is forced out of two slotted openings 55 into the space 53 between the water cushion beam 25 and the glass panel 3. The exit ports 55, through which the fluid (water) exits, are in this case tilted such that they are placed obliquely with respect to each other so that in the area between the discharge nozzles 55 (these are slit nozzles, for example), an elevated pressure forms that presses the glass panel 3 as a workpiece firmly against the belt drive 23, so that the necessary traction for secure transport of the workpiece (glass panel 3) is achieved.

In both the embodiment according to FIG. 6 and the one according to FIG. 7, it is possible to design the water cushion beam 25 with the cross-sectional shape, shown in FIGS. 6 and 7, in one piece over the entire length, or alternatively assembled together in multiple sections, whereby it is taken into account that in each case round elements are provided, so that the outlet nozzles 51 and 53 are ring nozzles. Nevertheless, elongated elements are preferred for the water cushion beam 25 with slit nozzles (51, 53).

The glass panels 3 are pressed by the water cushion beam 25 against the linear conveying means 23, for example the endless toothed belt or the series of endless belts or a train of powered rollers, so that the necessary traction is ensured, and the glass panel 3 can also be processed during the processing by abrasive disks 27 and/or trimming belts 29 (diamond belts, cf. FIG. 5) that are, for example, oriented crosswise.

In this case, it is provided that the endless belts 23 of the linear conveying means of the conveying device according to the invention are, over their entire lengths, supported from within—i.e., from the side that faces the glass panel 3—so that the necessary traction between the glass panel 3 to be conveyed and the linear conveying means 23 is ensured in all areas.

The lower and/or upper water cushion beam 25 can be adjustably mounted in the machine frame vertical to the conveying plane (plane of the glass panel 3). The pressure with which the glass panel 3 is pressed by the fluid (water) cushion between beams 25 and glass panel 3 against the linear conveying means 23 (for example, the toothed belts) can thus be varied in order to choose the pressure suitable for the strength (thickness) of the glass panel 3. In this case, it is preferable for the force with which the water cushion beam(s) 25 are loaded against the glass panel 3 to be ascertained by sensors ("force sensors"). These sensors can be functionally combined with the adjustment drive for the (adjustable) water cushion beams 25.

When the grinding stations 9/13 are designed as shown in FIGS. 3 and 5, it is possible to use either only the grinding heads 27 or only the grinding belts 29, or, alternatively, both the grinding heads 27 and the grinding belts 29; whereby the grinding belts 29 serve especially to remove (minute) defects on the edges of the glass panels 3 by trimming.

Because, according to the invention, a (fluid) water cushion beam 25 is used, not only is a damping effect achieved on the processed glass panel 3, meaning that vibrations in the glass panel 3 are suppressed, but also a higher power transmission is ensured. Additionally, cooling of the glass panel 3 is ensured during the treatment by grinding and/or trimming, and cleaning is similarly ensured by running it through running water, in that grinding debris is washed away by the water that comes from the water cushion beam 25.

Details of the turning mechanism (turning device 7) are outlined below according to FIGS. 8 and 9.

Figure 8:
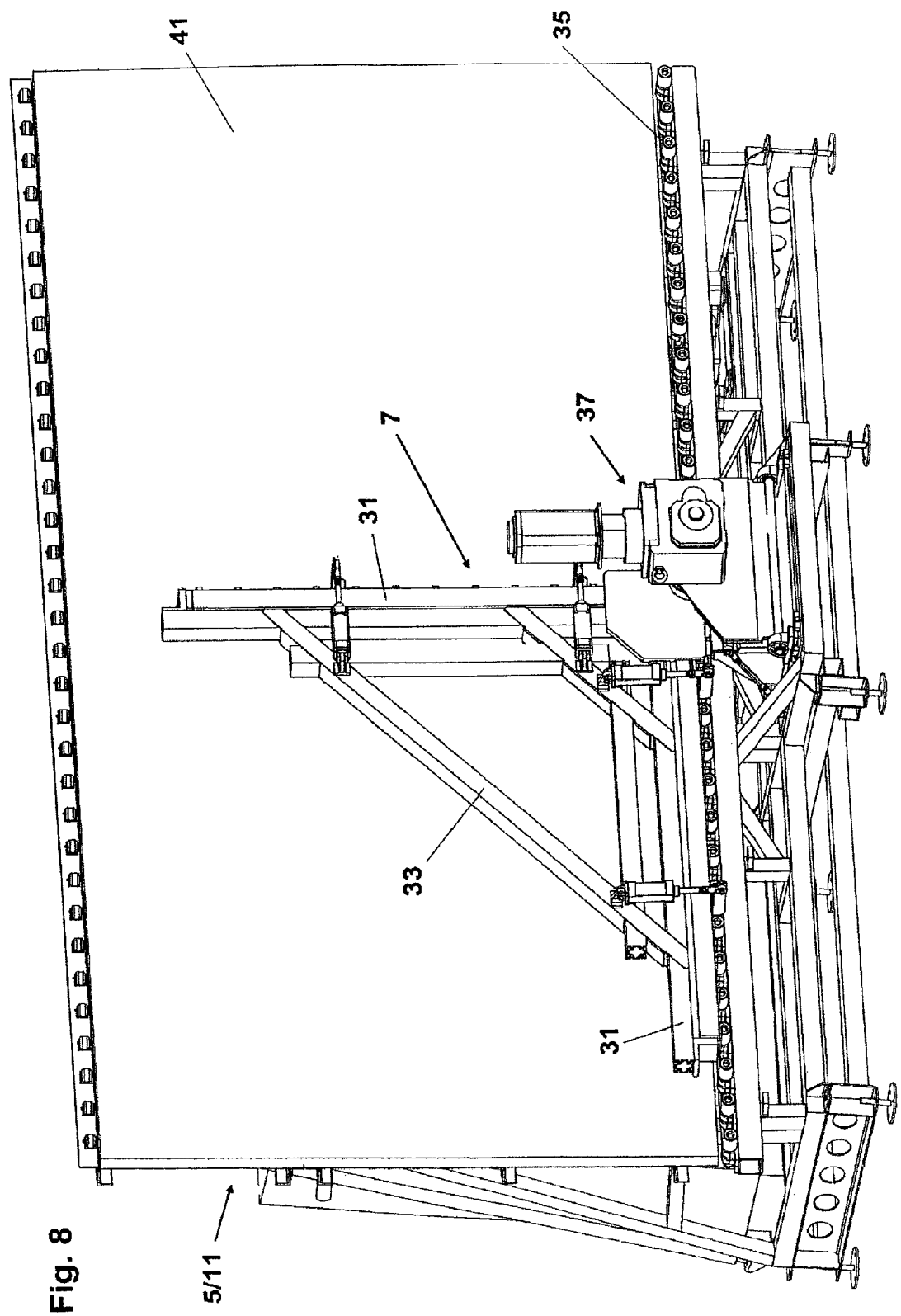
FIG. 8 shows a turning station.
Figure 9:
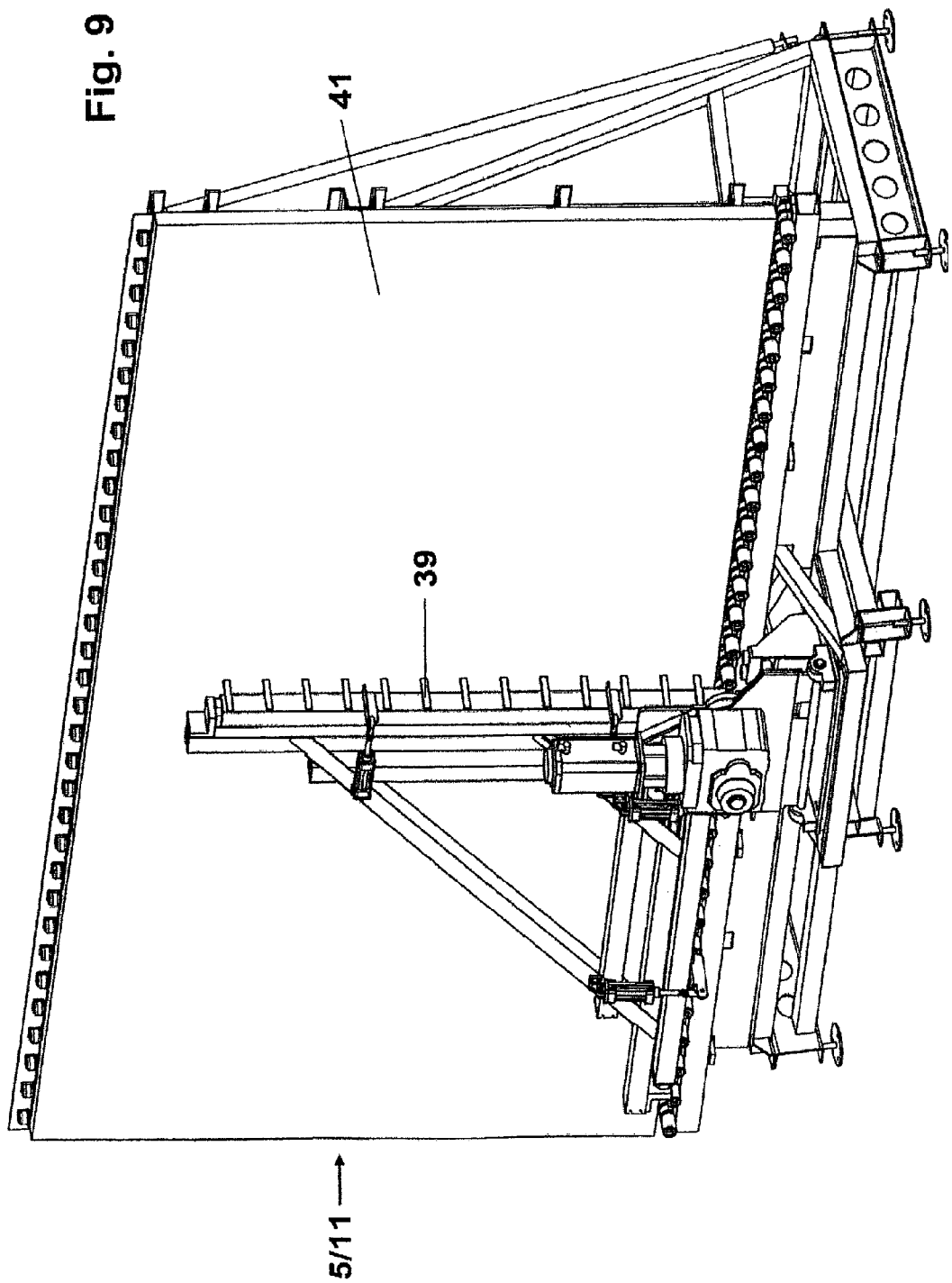
FIG. 9 shows the turning station from FIG. 8 from a different perspective.

The turning devices 7 provided in the turning stations 5 and 11 comprise, as shown in FIGS. 8 and 9, two arms 31, which together encompass a right angle. The arms 31 can be connected together by a connecting beam 33 in order to increase stability. A drive 37 is provided for pivoting the turning device 7 around an axis that runs perpendicular to the conveying plane of the glass panels 3, which axis is in the area of the lower horizontal conveyor 35, which in the example shown is a series of rotary-driven conveying rollers. With the drive 37, the turning device 7 can be pivoted 90 degrees in order to turn glass panels 3.

Each of the two arms 31 of the turning device 7 is equipped with a row of fingers 39 (FIG. 9). The fingers 39 can pivot on the arms 31 around an axis that is parallel to the longitudinal extension of the arm 31, so that they are pivoted out of the operating position shown in FIG. 9 in which they stand perpendicular to the conveying plane and to the plane of the supporting wall 41 (this wall is an air cushion wall in the embodiment shown), into a position parallel to the conveying plane (=plane of the supporting wall 41).

When a glass panel 3 is pivoted, the fingers 39, which are pivoted into their operating position (normally to the supporting wall 41), grip the edges of a glass panel 3 to be turned, so that the panel, sliding on the air cushion of the support wall 41, is touched only on its edges; i.e., the surface facing away from the supporting wall 41 is not touched. In this way, a gentle turning is ensured, whereby scratching or damaging of the front side of the glass panel 3 and/or a coating (photovoltaic elements) that has been affixed to it is precluded.

The rollers 35 of the linear conveyor on the lower edge of the supporting wall 41 can be powered by a drive, not shown.

In summary, an embodiment of the invention can be described as follows.

A linear conveyor 21 for transporting glass panels 3 in the area of grinding stations 9, 13 or a washing station 15, a facility for the manufacturing of glass panel blanks, has a linear conveyor 23, for example a powered toothed belt; across from this lies a beam 25, out of which a fluid, especially water, exits. The glass panel 3 is clamped firmly against the linear conveyor 23 by the water exiting the beam 25 and securely conveyed. Such linear conveyors 21 can be arranged on the upper or lower edge of a glass panel 3 in order to, for example, trim said panel using at least one abrasive disk 27. Correspondingly, linear conveyors 21 may also be provided in a washing station 5, 11. To pivot the glass panels 3 90 degrees, so that first both the upper and lower edges and then the initially vertical edges of the same can be processed, turning stations 5, 11 are provided; these turning stations have turning grippers 7, on which pivotable fingers 39 are provided that, to pivot glass panels 3, touch them only on their lateral edges.

The invention claimed is:

1. A device for conveying flat workpieces, the device comprising:
    linear conveyors; and
    beams each provided across from a corresponding linear conveyor, a fluid exiting from the beam, the fluid pressing the workpiece that is arranged between one of the linear conveyors and the corresponding beam firmly against the linear conveyor,
    wherein when standing workpieces are transported, the linear conveyors and the beams are disposed both in the area of an upper edge and in the area of the lower edge of each workpiece.

2. The device according to claim 1, wherein the upper edge and the lower edge of the workpiece are arranged over the conveyors and the beams, the conveyors being linear, and
    at least one tool is assigned to each of the upper and lower edges of the workpiece.

3. The device according to claim 1, wherein, underneath a lower linear one of the conveyors and the corresponding beam, a support is provided for the workpiece that is transported standing; the support being a train of selectively powered rollers.

4. The device according to claim 1, wherein the distance between a lower linear one of the conveyors and an upper linear one of the conveyors is variable, the upper linear conveyor being adjustable in the plane in which the workpiece is conveyed.

5. The device according to claim 1, wherein the beam has at least two slots, separated from one another, for the discharge of fluid.

6. The device according to claim 5, wherein the slots diverge toward a free side of the beam, the free side lying across from the workpiece.

7. The device according to claim 5, wherein the slots converge toward a free side of the beam, the free side lying across from the workpiece.

8. The device according to claim 1, wherein the beam is composed of multiple sections.

9. The device according to claim 1, wherein the beam is assembled out of multiple circular elements, and
    the nozzles are ring nozzles.

10. The device according to claim 1, wherein the beam is adjustable transversely to the conveying plane of the workpiece.

11. The device according to claim 10, further comprising at least one drive provided for adjustment of the beam.

12. The device according to claim 10, further comprising at least one sensor that records the force with which the beam is loaded toward the workpiece.

13. The device according to claim 12, wherein the sensor is functionally connected to the drive.

14. A facility for treating glass panel blanks, the facility comprising:
    at least one grinding station;
    a washing station; and
    the devices according to claim 1 provided in the area of the at least one grinding station and the washing station.

15. The facility according to claim 14, wherein two grinding stations are provided, in which each of upper and lower edges of the workpiece are processed, and wherein before a first of the grinding stations, a turning station with a turning device is provided, and after the first grinding station and before a second of the grinding stations, another turning station with a turning device is provided.

16. The facility according to claim 15, wherein the turning device has two arms, on which pivotable fingers are provided for gripping the upper and lower edges of the workpiece.

17. The facility according to claim 16, wherein the fingers on the arms can pivot around an axis parallel to the longitudinal extension of the arm, such that the fingers can pivot from an operating position, in which the fingers stand essentially perpendicular to the conveying plane, to a readiness position, in which the fingers are oriented in the conveying direction.

18. The device according to claim 1, wherein the flat workpieces are glass panels.

\* \* \* \* \*